United States Patent

Schlaepfer

[15] 3,683,413

[45] Aug. 8, 1972

[54] METHOD FOR MERGING VARIABLE AND FIXED MAGNETIC DATA ON A CREDIT CARD OR THE LIKE

[72] Inventor: Carl E. Schlaepfer, Poughkeepsie, N.Y.

[73] Assignee: International Business Machines Corporation, Armonk, N.Y.

[22] Filed: Dec. 29, 1969

[21] Appl. No.: 888,638

[52] U.S. Cl...........340/174.1 R, 179/100.2 A, 235/61.12 M

[51] Int. Cl........G11b 5/02, G11b 5/80, G06k 19/06

[58] Field of Search.....179/100.2, 100.2 A, 100.2 T; 340/174.1; 235/61.12 M

[56] References Cited

UNITED STATES PATENTS

| | | | |
|---|---|---|---|
| 2,906,827 | 9/1959 | Gordon | 179/100.2 |
| 3,160,704 | 12/1964 | Hollingsworth | 179/100.2 |
| 3,527,898 | 9/1970 | Camras | 179/100.2 CA |
| 2,952,008 | 9/1960 | Mitchell et al. | 340/174 |
| 3,100,834 | 8/1963 | Demer | 235/61.12 |
| 2,779,540 | 1/1957 | Hoeppner | 235/61.12 M |

*Primary Examiner*—J. Russell Goudeau
*Attorney*—Sughrue, Rothwell, Mion, Zinn & Macpeak

[57] ABSTRACT

A plurality of discrete magnetic bits are affixed to a record card in a predetermined low density pattern. High density information is subsequently recorded on said discrete bits by utilizing a magnetic head having a gap positioned at an oblique slant with respect to the discrete bits.

1 Claim, 4 Drawing Figures

INVENTOR
CARL E. SCHLAEPFER

BY Sughrue, Rothwell, Mion, Zinn & Macpeak
ATTORNEYS

METHOD FOR MERGING VARIABLE AND FIXED MAGNETIC DATA ON A CREDIT CARD OR THE LIKE

BACKGROUND OF THE INVENTION

1. Field of the Invention

The present invention is directed to the recording of magnetic data and more specifically, the recording of variable magnetic data on fixed magnetic data.

2. Prior Art

In the field of credit cards, numerous attempts have been made to provide a fraud-proof credit card by the inclusion of a picture of the card-bearer, special signature strips and coded information in the form of a visible pattern. Most of these precautions however, are in the nature of preventing the unauthorized use of one person's card by another and do not approach the problem of counterfeit cards.

The use of discrete magnetic bits on a record card is old and well known in the art but in these situations the magnetic information is recorded in bit form on a continuous stripe of magnetizable material and no means are provided for recording additional information over the discrete magnetic bits.

It is also known in the prior art, to utilize an oblique gap in a recording head to record ac flux patterns diagonally on a rectilinear magnetic spot in order to obtain a greater sensitivity for the size of the spot than could be obtained by recording normally or perpendicularly to the axis of the spot.

SUMMARY OF THE INVENTION

The present invention combines low density and high density (or fixed and variable or discrete and continuous) magnetic information on a record card by utilizing a predetermined low density pattern of fixed, discrete magnetic bits on the card in recording high density information on the card by means of a transducer having a gap positioned at an oblique slant with respect to the discrete bits.

Thus, it is possible to provide a predetermined identification code comprised of fixed, low density, non-erasable magnetic bits and updatable information in the form of high density information recorded on the low density magnetic bits. Since the updatable information is invisible it will act as a deterrent to any one attempting to produce a counterfeit card, especially since the high density magnetic information which is recorded on the low density discrete magnetic bits can be changed periodically. In addition, the use of a fixed code is a deterrent as removal of a bit changes the code and weakens the signal of the updatable information in a detectable manner.

DETAILED DESCRIPTION OF THE INVENTION

Figure 1:
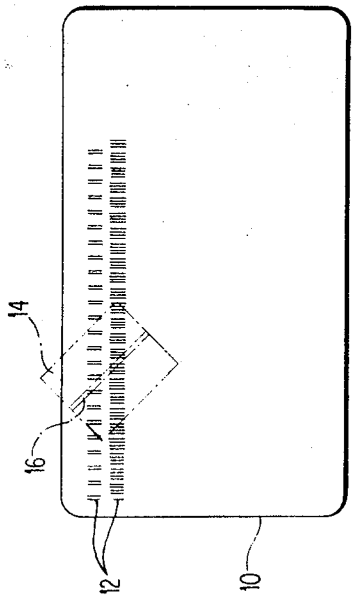
FIG. 1 is a view of a record card with the discrete magnetic bits visibly shown for purposes of illustration and a magnetic head shown in phantom lines.

The credit card 10 shown in FIG. 1 may be of any suitable construction such as a semi-rigid plastic laminate most commonly in use today. In addition to any printed or embossed information (not shown) on the card which provides a visual means of identification, the card 10 is also provided with a plurality of discrete hot-stamped magnetic bits 12 which are placed in a predetermined pattern on the card. The magnetic bits are distributed in a low density pattern whereby it is not feasible to read or write additional magnetic information thereon by means of a conventional magnetic head having a gap generally aligned in the same direction as the discrete magnetic bits.

Thus, in order to record additionally high density information on the discrete low density magnetic particles, the magnetic head is disposed at an angle such that the gap 16 will be disposed at an oblique angle relative to the longitudinal orientation of the magnetic bits permanently affixed to the card. In this manner, enough magnetic material will be present in the area covered by the gap 16, in the head 14, to record the high density magnetic information. Likewise, the gap of the read head will be similarly disposed so as to pick up the high density magnetic information which was previously recorded on the discrete magnetic bits.

Figure 2:
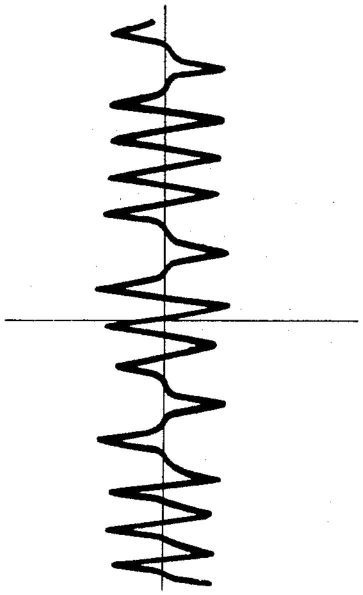
FIGS. 2, 3 and 4 are graphic representations of the magnetic information contained on the card.
Figure 3:
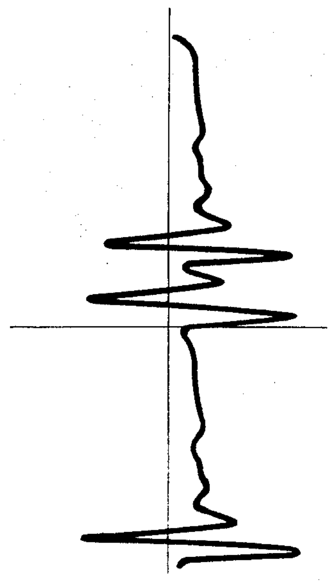
Figure 4:
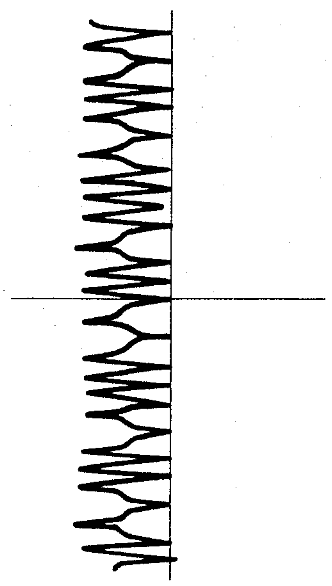

An example of this concept is shown in FIGS. 2, 3 and 4, where in 200 BPI data was recorded onto a card as shown in FIG. 1, with the head slanted at 45°. The read-back of this variable data directly from the card is shown in FIG. 2. Then, all of the magnetic information on the card is passive transferred to a magnetic stripe on a length of magnetic copy tape by placing the card and copy tape together and subjecting them to a magnetic transfer field. The low density pattern was read back from the copy tape at 170 inches/second as shown in FIG. 3 and the previously recorded 200 BPI data was read back from the card as shown in FIG. 4, showing the expectant "first transfer" attenuation of the variable signal on the card. The variable, or high density, signal may also be read from the copy tape by scanning said tape with a magnetic head having an appropriately skewed read gap.

The magnetic information on card 10 may also be read utilizing the following techniques not requiring transfer to a copy medium. In this aspect of the invention, the fixed information bits 12 must first be prebiased. This may be accomplished by saturation biasing or by net magnetic biasing due to the variable data recording, as will be more fully described below.

The saturation biasing process for reading the fixed and variable data from card 10 comprises the following steps: First, reading the variable information directly from card 10 and storing the same. The next step is saturation biasing the discrete bits 12, thus destroying or erasing the variable information on the card 10. Next, reading the biased, discrete bits directly from the card by scanning with a magnetic head (not shown). Finally, recording the variable data previously read and stored, or modified or updated variable data as desired with magnetic head 14.

The net magnetic biasing process for reading the magnetic data from card 10 will next be described. In this aspect of the invention, prebiasing of discrete bits 12 is accomplished when the variable data is originally recorded on card 10. This is accomplished by recording the variable information in such a manner that there is a net magnetic bias associated with each bit 12 of the fixed data pattern. Such a net bias occurs when recording in a return to zero (RZ), discrete pulse, and other unsymmetrical recording modes. In this sense, even normally symmetrical recording modes (such as F/2F, NRZ, NRZI, Phase Encoding, Ferranti Encoding) can be made unsymmetrical by recording to the full saturation of the medium in one direction and less than saturation in the other, thus producing a net bias in each bit of the fixed data pattern. The fixed or variable data on a card 10 prepared by the net biasing technique described above may be read directly from the card 10 by a magnetic head having an appropriately skewed read gap.

While the invention has been particularly shown and described with reference to the preferred embodiment thereof, it will be understood by those skilled in the art, that the foregoing and various other changes in form and details may be made therein, without departing from the spirit and scope of my invention.

I claim:

1. A method of recording and reproducing fixed and variable information on a card comprising the steps of permanently recording said fixed pattern on said card by affixing thereto a pattern of discrete magnetic bits, recording said variable information on said low density pattern of discrete magnetic bits through a transducer having a gap positioned at an oblique slant with respect to said discrete bits, passive transferring said fixed and variable magnetic information to a magnetizable copy medium, reading said variable information from said card, storing said variable information, saturation biasing said discrete bits, reading said fixed information from said card, rerecording said variable information or recording new variable information on said card.

* * * * *